(12) United States Patent
Dobjelevski et al.

(10) Patent No.: US 7,773,606 B2
(45) Date of Patent: Aug. 10, 2010

(54) TIMING DISTRIBUTION WITHIN A NETWORK ELEMENT WHILE SUPPORTING MULTIPLE TIMING DOMAINS

(75) Inventors: Iouri Dobjelevski, Vancouver (CA); Darwin N. Hawes, Vancouver (CA); Dan Lee, Burnaby (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 122 days.

(21) Appl. No.: 12/235,424

(22) Filed: Sep. 22, 2008

(65) Prior Publication Data

US 2010/0074278 A1    Mar. 25, 2010

(51) Int. Cl.
*H04L 12/28* (2006.01)
(52) U.S. Cl. .................................. 370/395.62; 370/503
(58) Field of Classification Search .................. 370/386, 370/389, 395.62, 503, 509, 518
See application file for complete search history.

(56) References Cited

U.S. PATENT DOCUMENTS 6,128,318 A * 10/2000 Sato ........................... 370/503
6,973,093 B1 * 12/2005 Briddell et al. ............. 370/421

OTHER PUBLICATIONS

J. Burbank et al., "Network Time Protocol Version 4 Protocol And Algorithms Specification", draft-ietf-ntp-ntpv4-proto-10, RFC 4330, RFC 1305, Jul. 14, 2008, 111 pages.
"IEEE Standard for a Precision Clock Synchronization Protocol for Networked Measurement and Control Systems", IEEE Instrumentation and Measurement Society, IEEE Std 1588-2008, New York, NY, Jul. 24, 2008, 289 pages.

* cited by examiner

*Primary Examiner*—Brenda Pham
(74) *Attorney, Agent, or Firm*—Blakely, Sokoloff, Taylor & Zafman LLP

(57) ABSTRACT

According to one embodiment of the invention, a network element synchronizes a number of clocks within the system while supporting multiple independent timing domains. The network element includes a local clock, which is free-running and is not necessarily synchronized with an external reference, that synchronously provides a local time value to the slave and master interfaces of each timing domain. Each slave interface of each timing domain independently determines timing information based on a received master clock synchronization event and the value of the local time when that synchronization event was received. The timing information is distributed to the master interfaces of the appropriate timing domain, and each master interface calculates an adjusted synchronization event based on the received timing information and the value of the local time when that timing information was received. The adjusted synchronization events are transmitted out of the network element to an external slave interface.

17 Claims, 3 Drawing Sheets

TIMING DISTRIBUTION WITHIN A NETWORK ELEMENT WHILE SUPPORTING MULTIPLE TIMING DOMAINS

BACKGROUND

1. Field

Embodiments of the invention relate to the field of networking; and more specifically, embodiments of the invention relate to synchronizing clocks located on a network element.

2. Background

A network element is a piece of networking equipment, including hardware and software that communicatively interconnects other equipment on the network (e.g., other network elements, computer end stations, etc.). Network elements may need to be synchronized. Typically network elements include multiple line cards which may be independently timed. In addition, some network elements allow multiple operators (e.g., service providers) to share one or more line cards and may each maintain their own timing synchronization hierarchy. Existing synchronization methods include network based and channel based methods. Network based methods rely on packet based protocols, such as the Network Time Protocol (NTP) described in Internet Engineering Task Force (IETF) draft "Network Time Protocol Version 4 Protocol And Algorithms Specification", Jul. 14, 2008, to distribute timing between the network elements. Channel based methods use a physical circuit or a radio channel to transmit timing information (for example, the Global Positioning System (GPS)). The network based methods offer greater flexibility and scalability, while the circuit based methods offer higher precision.

One prior art technique of network based clock synchronizing is the Institute of Electrical and Electronics Engineers (IEEE) 1588-2008 standard, "IEEE Standard for a Precision Clock Synchronization Protocol for Networked Measurement and Control Systems", Mar. 27, 2008 (hereinafter "the IEEE 1588 standard"). The IEEE 1588 standard is a protocol designed to synchronize real-time clocks in nodes of a distributed system that communicate using a multicast capable network, such as Ethernet. In addition, the IEEE 1588 standard provides for a protocol known as the precision time protocol (PTP).

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
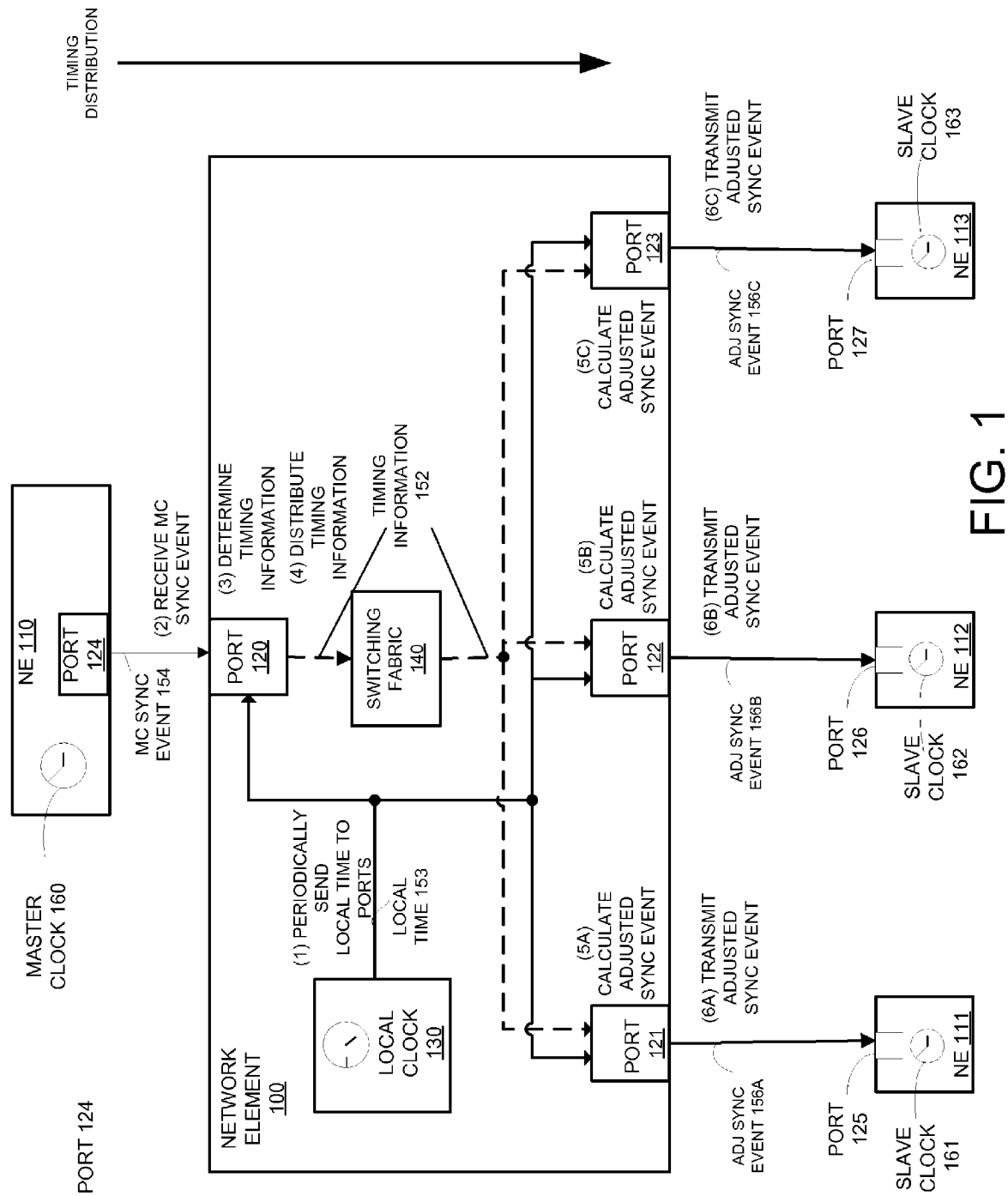
FIG. 1 is a data flow diagram illustrating an exemplary network element providing improved clock synchronization according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer end station, a network element, etc.). Such electronic devices store and communicate (internally and with other electronic devices over a network) code and data using machine-readable media, such as machine storage media (e.g., magnetic disks; optical disks; random access memory; read only memory; flash memory devices; phase-change memory) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Some network elements are multiple services network elements that provide support for multiple networking functions (e.g., routing, bridging, switching, Layer 2 aggregation, and subscriber management or any combination of routing, bridging, switching, Layer 2 aggregation, and subscriber management), and/or provide support for multiple application services (e.g., data, voice, and video). Subscriber computer end stations (e.g., workstations, laptops, palm tops, mobile phones, smartphones, multimedia phones, portable media players, GPS units, gaming systems, set-top boxes, etc.) access content/services provided over the Internet and/or content/services provided on virtual private networks (VPNs) overlaid on the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, subscriber computing end stations are coupled (e.g., through customer premise equipment coupled to an access network (wired or wirelessly) to edge network elements, which are coupled through one or more core network elements to the server computing end stations.

A used herein, a synchronization event is communication of synchronization signals between network elements typically by transmission of one or more packets. In one embodiment of the invention, the IEEE 1588 standard defines the network protocol for communication the synchronization signals between network elements.

As used herein, a port is the logical access point of a NE for receiving and distributing synchronization events. The port includes circuitry for handling packets including a number of execution units and/or logic circuits and/or software for handling packets.

As mentioned above, clock synchronization provides accurate timing across the different network elements within the network. For example, in the IEEE 1588 standard, the network elements may synchronize their individual clocks in order share a common time base. That is, instead of sharing timing signals directly, these network elements periodically exchange information and adjust their local timing sources to match each other. A network element typically includes multiple line cards which may be independently timed. In addition, some network elements allow multiple operators (e.g., service providers) to share one or more line cards and may each maintain their own clock synchronization hierarchy.

A method and apparatus for high precision synchronization of clocks located on different line cards within a network element while supporting multiple independent timing domains is described. FIG. 1 is a data flow diagram illustrating an exemplary network element providing improved clock synchronization according to one embodiment of the invention. FIG. 1 includes the network elements 100, 110, 111, 112, and 113. The network element 100 is coupled with the network element 110, 111, 112, and 113. Timing information is distributed from the network element 110 through the network element 100 to the network elements 111, 112, and 113. The network element 100 includes the local clock 130, the switching fabric 140, and the ports 120, 121, 122, and 123. The switching fabric 140 performs asynchronous information transfer between the ports 120-123. In one embodiment of the invention, the ports 120-123 are IEEE 1588 capable Ethernet ports, where the port 120 is an IEEE 1588 slave interface and the ports 121, 122, and 123 are each IEEE 1588 master interfaces. In one embodiment of the invention, the network element 100 implements IEEE 1588 Boundary, Ordinary, or Transparent Clock function. In one embodiment of the invention, the port 120 is located on a different line card than the ports 121, 122, and 123.

The network element 110 includes the master clock 160 and the port 124. According to one embodiment of the invention, the port 124 is an IEEE 1588 capable Ethernet port and is an IEEE 1588 master interface. The network elements 111, 112, and 113 include the slave clocks 161, 162, and 163 and the ports 125, 126, and 127 respectively. The ports 125, 126, and 127 are each IEEE 1588 capable Ethernet ports and are IEEE 1588 slave interfaces. According to one embodiment of the invention, the master clock 160 is an IEEE 1588 master clock and the slave clocks 161, 162, and 163 are each IEEE 1588 slave clocks.

In one embodiment of the invention, the local clock 130 is free running and is not adjusted or synchronized with external sources. For example, the local clock 130 is not adjusted or synchronized with the master clock 160. However, it should be understood that in some embodiments of the invention the local clock 130 may be synchronized with an unrelated external clock (e.g., a clock other than the master clock 160). Thus, unlike typical network elements using the IEEE 1588 standard, the network element 100 is not adjusted to agree with the master clock. The clock rate (e.g., the number of "ticks" per second) of the local clock 130 is known to the software of the network element 100 within a reasonable degree of accuracy. According to one embodiment of the invention, the local clock 130 synchronously distributes a local time value 153 to the ports 120-123 (e.g., through one or more dedicated circuits) periodically (e.g., every few milliseconds). Thus, each of the ports 120-123 receive the same local time value 153 at the same time. There are many methods and mechanisms for distributing the local time value 153 and any of these methods and mechanisms may be used in embodiments of the invention described herein. Thus, at operation 1, the local clock 130 periodically transmits the local time value 153 to the ports 120, 121, 122, and 123.

Sometime later, at operation 2, the port 120 receives a master clock synchronization event 154 transmitted from the port 124. The master clock synchronization event 154 includes a master clock 160 time value. It should be understood that the port 124 periodically transmits master clock synchronization events as determined by the master clock 160. According to one embodiment of the invention, the Precision Time Protocol (PTP) as described in the IEEE 1588 standard is used to transmit the master clock synchronization event 154.

Sometime after receiving the master clock synchronization event, at operation 3, the port 120 determines timing information based on the local time value 153 and the master clock synchronization event 154. For example, in one embodiment of the invention, the port 120 determines the following timing information upon receipt of a master clock synchronization event: the port 120 synchronization time ($SAT_{P120}$), the local clock value 153 at the moment of receipt of the master clock synchronization event ($LC_{P120}$), and the rate of change (ROC). The port 120 synchronization time ($ST_{P120}$) represents the master clock 160 time value transmitted from the port 124 and received by the port 120. In one embodiment of the invention, PTP compensates for any packet transmission delay between the port 124 and the port 120.

The rate of change indicates, how fast or slow the local clock 130 changes relatively to the master clock 160. For example, in one embodiment of the invention, the calculation of the rate of change is the following: ROC=local clock 130 ticks per second/master clock 160 ticks per second. The rate of change is estimated using a phased-locked loop (PLL) or any other applicable algorithm(s) or method(s). Port 120 bases the estimation on the historical values of $ST_{P120}$ and $LC_{P120}$ recorded during a number of previous synchronization events. For example, if ROC=1, then the local clock 130 and the master clock 160 are running at the same rate; if ROC>1, then the local clock 130 is running faster than the master clock 160; and if ROC<1, then the local clock 130 is running slower than the master clock 160. It should be understood that the rate of change indicates the difference in the rate of change of two clocks (e.g., the local clock 130 and the master clock 160) but does not indicate the difference in the time values of those two clocks.

Sometime after determining the timing information, at operation 4 the port 120 distributes that timing information to the master interfaces within the network element 100 (e.g., to the ports 121, 122, and 123). For example, the timing information 152 is distributed through the switching fabric 140 to the ports 121, 122, and 123. According to one embodiment of the invention the switching fabric 140 asynchronously switches the timing information 152 to the ports 121, 122, and 123 such that the ports 121, 122, and 123 may each receive the timing information 152 at a different time.

Sometime after receiving the timing information, the ports 121, 122, and 123 begin the process of transmitting a synchronization event with the network elements 111, 112, and 113 respectively. It should be understood that there is some latency between the time the port 120 receives the master clock synchronization event 154 and when the ports 121, 122, and 123 transmit synchronization events. This latency occurs due to the time needed to transmit the timing information from the port 120 to the ports 121, 122, and 123 and the time needed to interpret and process this information. Therefore, at operations 5A, 5B, and 5C, the ports 121, 122, and 123 each calculate an adjusted synchronization event to compensate for this latency In the following description, the calculation for the adjusted synchronization event 156A is used as an example and similarly applies to the calculation for the adjusted synchronization events 156B and 156C. The port 121 calculates the latency as the following: the local clock value 153 acquired by the port 121 at the moment of the port 121 receiving the timing information 152 ($LC_{P121}$) minus the local clock value 153 acquired by the port 120 at the moment the port 120 receives the master clock synchronization event 154 ($LC_{P120}$), divided by the rate of change as determined by the port 120. Thus, the port 121 calculates the latency as ($LC_{P121}-LC_{P120}$)/ROC. Similarly, the port 122 calculates the latency as ($LC_{P122}-LC_{P120}$)/ROC; and the port 123 calculates the latency as ($LC_{P123}-LC_{P120}$)/ROC. It should be understood that the amount of latency may be different between the ports 121, 122, and 123.

In addition to calculating the latency, the port 121 calculates the true time value (referred to as the port 121 synchronization time ($ST_{P121}$), which will be included in the adjusted synchronization event 156A) as the port 120 synchronization time ($ST_{P120}$) plus the latency. Thus, the port 121 calculates the port 121 synchronization time as $ST_{P120}$+Latency. Similarly, the port 122 calculates the port 122 synchronization time as $ST_{P120}$+Latency; and the port 123 calculates the port 123 synchronization time as $ST_{P120}$+Latency.

Sometime after adjusting for the latency, at operations 6A, 6B, and 6C, the ports 121, 122, and 123 transmit the adjusted synchronization events 156A, 156B, and 156C respectively. According to one embodiment of the invention, the adjusted synchronization events 156A-156C are transmitted according to protocol(s) described in the IEEE 1588 standard.

According to some embodiments of the invention, multiple timing domains are supported by the network element. A timing domain includes a collection of clocks (timers), whose time value and the rate of change of the time value is synchronized with each other. For example, FIG. 1 illustrates a single timing domain, where the slave clocks 161, 162, and 163 are synchronized with the master clock 160.

Figure 2:
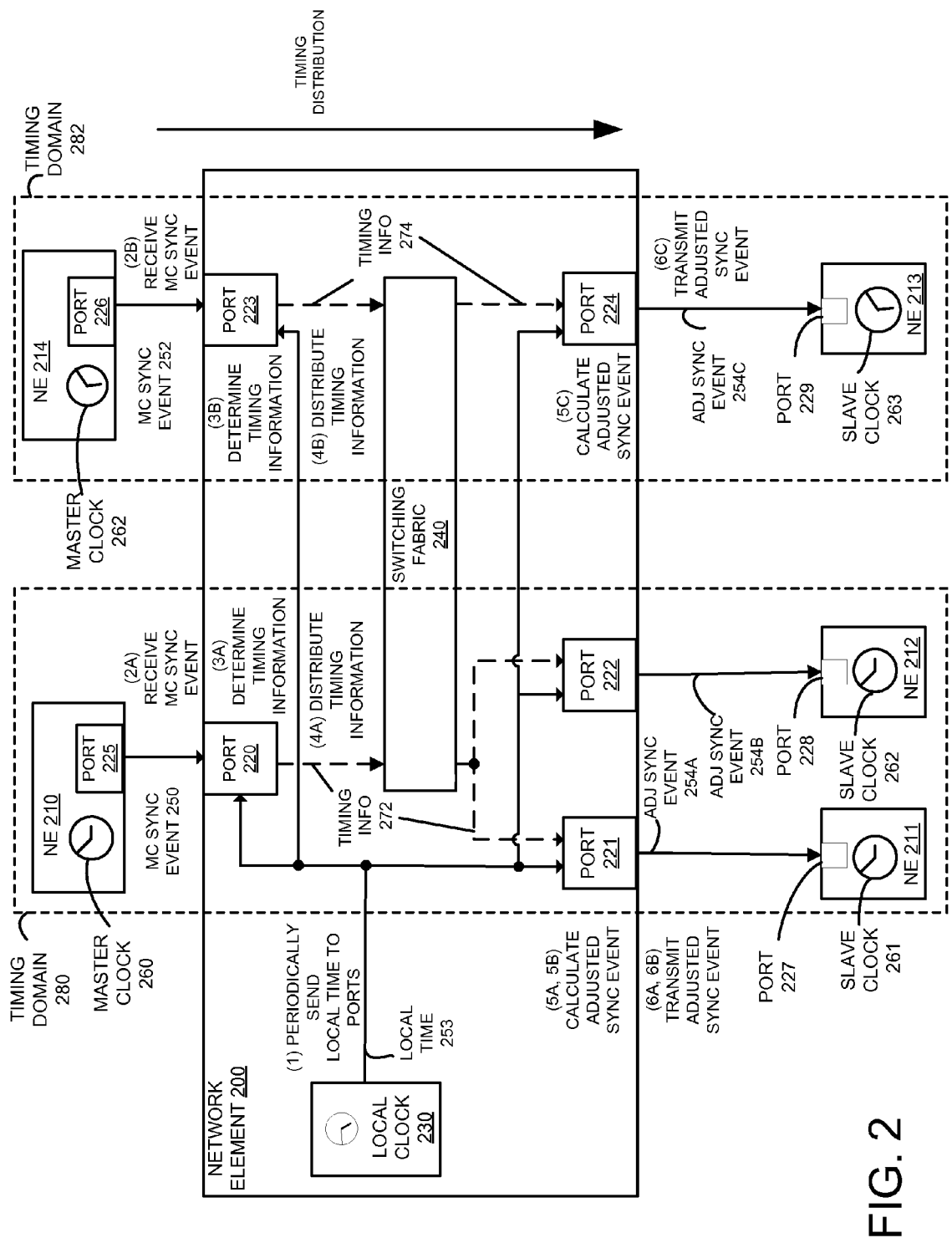
FIG. 2 is a data flow diagram illustrating an exemplary network element providing improved clock synchronization for multiple timing domains according to one embodiment of the invention.

FIG. 2 is a block diagram illustrating an exemplary network element providing improved clock synchronization for multiple timing domains according to one embodiment of the invention. FIG. 2 includes the network elements 200, 210, 211, 212, 213, and 214. The network element 200 is coupled with the network elements 210, 211, 212, 213, and 214. The network element 200 includes the local clock 230, the switching fabric 240, and the ports 220, 221, 222, 223, and 224. The switching fabric 240 performs asynchronous information transfer between the ports 220-222 and 224-223. In one embodiment of the invention, the ports 220-224 are IEEE 1588 capable Ethernet ports, where the ports 220 and 223 are IEEE 1588 slave interfaces and the ports 221, 222, and 224 are each IEEE 1588 master interfaces. In one embodiment of the invention, the network element 200 implements IEEE 1588 Boundary, Ordinary, or Transparent Clock function. It should be understood that the ports 220, 221, 222, 223, and 224 may each reside on different line cards within the network element 200. For example, in one embodiment of the invention, the port 220 and the port 223 are located on different line cards from the ports 221, 222, and 223.

The network element 210 includes the master clock 260 and the port 225. According to one embodiment of the invention, the port 225 is an IEEE 1588 standard master interface. The network elements 211 and 212 include the slave clocks 261 and 262 and the ports 227 and 228 respectively. According to one embodiment of the invention, the master clock 260 is an IEEE 1588 standard master clock and the slave clocks 261 and 262 are each IEEE 1588 standard slave clocks.

The network element 214 includes the master clock 262 and the port 226. According to one embodiment of the invention, the port 226 is an IEEE 1588 standard master interface. The network element 213 includes the slave clock 263 and the port 229, which is an IEEE 1588 standard slave interface. According to one embodiment of the invention, the master clock 262 is an IEEE 1588 standard master clock and the slave clocks 263 is an IEEE 1588 standard slave clock.

FIG. 2 illustrates two timing domains, the timing domain 280 and the timing domain 282. The timing domain 280 includes the port 225 of the network element 210, the ports 220, 221, and 222 of the network element 200, and the ports 227 and 228 of the network elements 211 and 212 respectively. The timing domain 282 includes the port 226 of the network element 214, the ports 223 and 224 of the network element 200, and the port 229 of the network element 213. The ports 220 and 223 receive time synchronization signals from the master clocks 260 and 262 on the network elements 210 and 214 respectively (e.g., the master clock sync events 250 and 252 respectively). The network elements 211 and 212 include the slave clocks 261 and 262 respectively. The slave clocks 261 and 262 are synchronized with the master clock 260. The network element 213 includes the slave clock 263 which is synchronized with the master clock 262. According to one embodiment of the invention, the timing domains 280 and 282 are independent from each other (e.g., the master clocks 260 and 262 are different and are not synchronized and similarly the slave clocks 261-262 are not synchronized with the slave clock 263). In addition, according to one embodiment of the invention the timing domain 280 is maintained by a different service provider than that of the timing domain 282.

According to one embodiment of the invention, the local clock 230 is free running and is not adjusted or synchronized with external sources. For example, the local clock 230 is not adjusted or synchronized with the master clock 260 or the master clock 262. Thus, unlike typical network elements using the IEEE 1588 standard, the network element 200 is not adjusted to agree with a master clock from any timing domain. However, it should be understood that in some embodiments of the invention the local clock 230 may be synchronized with an unrelated external clock (e.g., a clock other than the master clocks 260 or 262). The clock rate (e.g., the number of "ticks" per second) of the local clock 230 is known to the software of the network element 200 within a reasonable degree of accuracy. According to one embodiment of the invention, the local clock 230 synchronously distributes a local time value 253 to the ports 220, 221, 222, 223, and 224 (e.g., through one or more dedicated circuits) periodically (e.g., every few milliseconds). Thus, the local clock 230 is shared among the timing domains 280 and 281. Thus, each of the ports 220-224 receive the same local time value 253 at the same time regardless of timing domain. There are many methods and mechanisms for distributing the local time value 253 and any of these methods and mechanisms may be used in embodiments of the invention described herein. Thus, at operation 1, the local clock 230 periodically transmits the local time value 253 to the ports 220-224.

Sometime later, at operations 2A and 2B, the ports 220 and 223 receive the master clock synchronization events 250 and 252 respectively. The master clock synchronization events 250 and 252 include a time value from the master clock 260 and the master clock 262 respectively. It should be understood that the ports 225 and 226 periodically transmit master clock synchronization events as determined by the master clock 260 and 262 respectively. According to one embodiment of the invention, the Precision Time Protocol (PTP) is used to transmit the master clock synchronization events 250 and 252.

Sometime after receiving the master clock synchronization event, at operation 3A and 3B, the ports 220 and 223 determine timing information based on the local time value 253 and the master clock synchronization events 250 and 252 respectively. For example, in one embodiment of the invention, the port 220 determines the following timing information upon receipt of a master clock synchronization event: the port 220 synchronization time ($SAT_{P220}$), the local clock value 253 at the moment of receipt of the master clock synchronization event 250 ($LC_{P220}$), and the rate of change (ROC) with respect to the local clock 230 and the master clock 260. The port 220 synchronization time ($ST_{P120}$) represents the master clock 260 time value transmitted from the port 225 and received by the port 220. In one embodiment of the invention, PTP compensates for any packet transmission delay between the port 225 and the port 220. In a similar fashion, the port 223 determines the following timing information: the port 223 synchronization time ($STP_{223}$), the local clock value 253 at the moment of receipt of the master clock synchronization event 252 ($LCP_{223}$), and the rate of change (ROC) with respect to the local clock 230 and the master clock 262. The rate of change may be found in a similar fashion as described with reference to FIG. 1.

Sometime after determining the timing information, at operations 4A and 4B the ports 220 and 223 distribute that timing information to the ports 221-222, and 224 respectively. For example, the timing information 272 is distributed through the switching fabric 240 to the ports 221 and 222 and the timing information 274 is distributed through the switching fabric 240 to the port 224. According to one embodiment of the invention, the switching fabric 240 asynchronously switches the timing information 272 and 274 such that the ports 221, 222, and 224 may each receive the timing information at a different time.

Sometime after receiving the timing information, the ports 221, 222, and 224 begin the process of transmitting a synchronization event with the network elements 211, 212, and 213 respectively. It should be understood that there is some latency between the time the ports 220 and 223 receive the master clock synchronization events 250 and 252 respectively and when the ports 221, 222, and 224 transmit synchronization events. This latency occurs due to the time needed to transmit the timing information from the ports 220 and 223 to the ports 221, 222, and 224 and the time needed to interpret and process this information. Therefore, at operations 5A, 5B, and 5C, the ports 221, 222, and 224 each calculate an adjusted synchronization event to compensate for this latency.

In the following description, the calculation for the adjusted synchronization event 254A is used as an example and similarly applies to the calculation for the adjusted synchronization events 254B and 254C. The port 221 calculates the latency as the following: the local clock value 253 acquired by the port 221 at the moment of the port 221 receiving the timing information 272 ($LC_{P221}$) minus the local clock value 253 acquired by the port 220 at the moment the port 220 receives the master clock synchronization event 250 ($LC_{P220}$), divided by the rate of change as determined by the port 220. Thus, the port 221 calculates the latency as $(LC_{P221}-LC_{P220})/ROC$. Similarly, the port 222 calculates the latency as $(LC_{P222}-LC_{P220})/ROC$; and the port 224 calculates the latency as $(LC_{P224}-LC_{P223})/ROC$. It should be understood that the amount of latency may be different between the ports 221, 222, and 224.

In addition to calculating the latency, the port 221 calculates the true time value (referred to as the port 221 synchronization time ($SAT_{P221}$), which will be included in the adjusted synchronization event 254A) as the port 220 synchronization time ($SAT_{P220}$) plus the latency. Thus, the port 221 calculates the port 221 synchronization time as $STP_{220}$+Latency. Similarly, the port 222 calculates the port 222 synchronization time as $STP_{220}$+Latency; and the port 224 calculates the port 224 synchronization time as $STP_{223}$+Latency.

Sometime after adjusting for the latency, at operations 6A, 6B, and 6C, the ports 221, 222, and 224 transmit the adjusted synchronization events 254A, 254B, and 254C respectively. According to one embodiment of the invention, the adjusted synchronization events 254A-254C are transmitted according to protocol(s) described in the IEEE 1588 standard.

Figure 3:
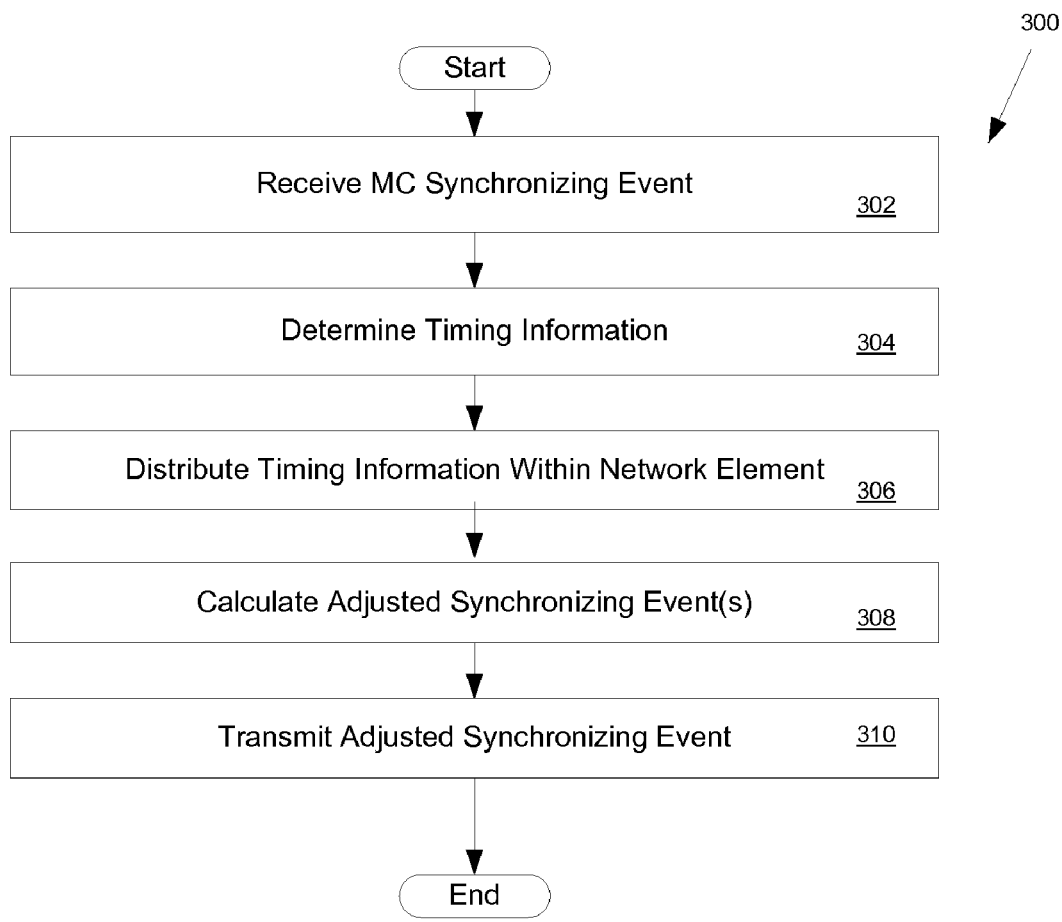
FIG. 3 is an exemplary flow chart illustrating improved clock synchronization according to one embodiment of the invention.

FIG. 3 is a flow diagram of one embodiment of a process 300 for distributing synchronization event within a network element. The process may be performed by processing logic that may comprise hardware (e.g., circuitry, dedicated logic, programmable logic, microcode, etc), software (such as that run on a network element), or a combination of both. The operations of the FIG. 3 will be described with reference to the exemplary embodiment of FIG. 1. However, it should be understood that the operations of FIG. 3 can be performed by embodiments of the invention other than those discussed with reference to FIG. 1, and the embodiments discussed with reference to FIG. 1 can perform operations different than those discussed with reference to FIG. 3. It should also be understood that the operations of FIG. 3 can be performed by embodiments of the invention as described with reference to FIG. 2.

Referring to FIG. 3, process 300 begins with processing logic receiving a MC synchronization event (block 302). For example, with reference to FIG. 1, the port 120 receives the MC synchronization event 154 from the master clock 160. Flow moves from block 302 to block 304. The precise time that the MC synchronization event is received is recorded.

At processing block 304, processing logic determines timing information. According to one embodiment of the invention, the timing information includes the master clock value received in the MC synchronization event, the value of the local time clock at the moment the MC synchronization event was received, and the rate of change. For example, with reference to FIG. 1, the port 120 determines the timing information 152 based on the MC synchronization event 154 and the value of the local time 153 at the time when the MC synchronization event 154 was received. The processing logic extracts the master clock time value from the MC synchronization event 154 and uses that time value along with the value of the local time 153 when the synchronization event 154 to determine a rate of change. The processing logic determines the rate of change using PLL or any other applicable algorithm or method. In one embodiment of the invention, processing logic determines the rate of change based on the historical values of the synchronization event and local times recorded during a number of previous synchronization events. Control flows from block 304 to block 306.

At processing block 306, processing logic distributes the timing information to ports included as part of the timing domain. For example, with reference to FIG. 1, since there is only one timing domain, the timing information 152 is transmitted (though the switching fabric 140) to the ports 121, 122, and 123. Processing logic distributes the timing information 152 using any applicable method within the network element. In one embodiment of the invention, packet based methods distribute the synchronization event and timing information 152. Flow moves from block 306 to block 308.

At processing block 308, processing logic calculates one or more adjusted synchronization events. For example, with reference to FIG. 1, the ports 121, 122, and 123 calculate the adjusted synchronization events 156A, 156B, and 156C respectively. The adjusted synchronization events are calculated using the processes described above in reference to FIG. 1. As mentioned with reference to FIG. 1, the adjusted synchronization events 156A, 156B, and 156C correct for the latency that occurs, among other things, during the process of receiving the MC synchronization event 154 and distributing it to the ports of the timing domain (e.g., the ports 121, 122, and 123 respectively). In one embodiment of the invention, latency occurs due to the time needed to transfer timing information from the receiving port to a transmitting port and time needed to interpret and process this information. Flow moves from block 308 to block 310.

At processing block 310, the adjusted synchronization events are transmitted out of the network element. For example, with reference to FIG. 1, the adjusted synchronization events 156A, 156B, and 156C are transmitted to the network elements 111, 112, and 113 respectively. In one embodiment of the invention, the IEEE 1855 standard covers the protocol used to transmit the adjusted synchronized events.

The embodiments of the invention provide an improved approach to clock synchronizing. For example, embodiments of the invention provide the advantage of an improved approach to maintain clock synchronization without increasing the frequency of initiating synchronization events. In addition, embodiments of the invention reduce the variations in network delay caused by jitter introduced by the network element.

Moreover, the embodiments of the invention provide an advantage in that it separates the "traffic" timing domain (e.g., timing acquired form network at an IEEE 1588 slave interface) from the "system" timing domain (e.g., time set by the chassis operator). Furthermore, the embodiments of the invention provide for the execution of multiple IEEE 1588 slave clock interfaces and distribute IEEE 1588 time derived from multiple slave interfaces independently from each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments of the invention, those skilled in the art will recognize that the invention is not limited to the embodiments described, can be practiced with modification and alteration within the spirit and scope of the appended claims. The description is thus to be regarded as illustrative instead of limiting.

What is claimed is:

1. A network element to distribute timing information between slave interfaces and master interfaces for multiple independent timing domains, the network element comprising:

a first and second timing domain including a first and second slave interface respectively and a first and second set of one or more master interfaces respectively, wherein the first timing domain is independent from the second timing domain;

a local clock to synchronously distribute a local time reference to the first and second slave interfaces and to the first and second set of master interfaces, wherein the local clock is free-running;

the first and second slave interfaces to receive an external first and second master clock synchronization event respectively and determine a first and second timing information based on a value of the local time reference when the first and second master clock synchronization event is received and the first and second master clock synchronization event respectively, the first and second slave interfaces further to asynchronously distribute the first and second timing information to the first and second set of master interfaces respectively, wherein the local clock is not synchronized with the first or second master clock synchronization event; and the first and second set of master interfaces to determine a first and second adjusted synchronization event based on the first and second timing information respectively and a value of the local time reference when the first and second timing information is received respectively to adjust for latency, the first and second set of master interfaces further to transmit the first and second adjusted synchronization event to an external first and second slave interfaces respectively.

2. The network element of claim 1, wherein the first and second timing information includes a first and second value of the local time reference when the first and second master clock synchronization event is received respectively, a first and second external time reference extracted from the first and second master clock synchronization event respectively, and a first and second rate of change between the first and second value of the local time reference and the first and second external time reference respectively.

3. The network element of claim 1, further comprising a first line card to include the first slave interface and a second line card to include the first set of master interfaces, wherein the timing information is distributed between the first line card and the second line card.

4. The network element of claim 1, further comprising one or more dedicated circuits to carry the synchronously distributed local time reference.

5. The network element of claim 1, wherein the local clock is to synchronously distribute the local time reference periodically such that the first and second slave interfaces and the first and second set of master interfaces receive the same local time reference at any given time.

6. The network element of claim 1, wherein the first and second master clock synchronization event are each received from an IEEE 1588 master clock, wherein the first and second slave interfaces are each IEEE 1588 capable Ethernet ports implementing IEEE 1588 slave interfaces, and wherein the first and second set of master interfaces are each IEEE 1588 capable Ethernet ports implementing IEEE 1588 master interfaces.

7. The network element of claim 6, wherein the network element implements IEEE 1588 Boundary, Ordinary, or Transparent Clock function.

8. A method for distributing timing information from slave interfaces to master interfaces of a network element for a plurality of independent timing domains, each timing domain including a slave interface and one or more master interfaces, each slave interface coupled with a separate external master clock and each master interface coupled with a separate external slave clocks, the method comprising:
- synchronously transmitting a local time value to the slave interfaces and the master interfaces at periodic intervals; and
- for each timing domain, performing the following:
  - receiving a master clock synchronization event at the slave interface from the coupled external master clock, the master clock synchronization event including a time value of the external master clock,
  - determining timing information based on the master clock synchronization event and the local time value when the master clock synchronization event is received,
  - asynchronously distributing the timing information to the one or more master interfaces,
  - each master interface determining an adjusted synchronization event, to adjust for latency, based on the timing information and the local time value when the timing information is received, and
  - transmitting each adjusted synchronization event to a corresponding external slave clock.

9. The method of claim 8, wherein the timing information includes the local time value when the master synchronization clock is received, the time value of the external master clock included in the master clock synchronization event, and a rate of change between the local time value and the time value of the external master clock.

10. The method of claim 8, wherein the timing information is asynchronously distributed through one or more dedicated circuits, and wherein for each timing domain, the slave interface is included in a different line card than the one or more master interfaces.

11. The method of claim 8, wherein each slave interface is an IEEE 1588 capable Ethernet ports implementing an IEEE 1588 slave interface and each master interface is an IEEE 1588 capable Ethernet port implementing an IEEE 1588 master interface.

12. The method of claim 11, wherein the network element implements IEEE 1588 Boundary, Ordinary, or Transparent Clock function.

13. A machine-readable storage medium encoded thereon machine executable instructions that when executed by a processor, will cause said processor to perform operations for distributing timing information from slave interfaces to master interfaces of a network element for a plurality of independent timing domains, each timing domain including a slave interface and one or more master interfaces, each slave interface coupled with a separate external master clock and each master interface coupled with a separate external slave clocks, the operations comprising:
- synchronously transmitting a local time value to the slave interfaces and the master interfaces at periodic intervals; and
- for each timing domain, performing the following:
  - receiving a master clock synchronization event at the slave interface from the coupled external master clock, the master clock synchronization event including a time value of the external master clock,
  - determining timing information based on the master clock synchronization event and the local time value when the master clock synchronization event is received,
  - asynchronously distributing the timing information to the one or more master interfaces,
  - each master interface determining an adjusted synchronization event, to adjust for latency, based on the timing information and the local time value when the timing information is received, and
  - transmitting each adjusted synchronization event to a corresponding external slave clock.

14. The machine-readable storage medium of claim 13, wherein the timing information includes the local time value when the master synchronization clock is received, the time value of the external master clock included in the master clock synchronization event, and a rate of change between the local time value and the time value of the external master clock.

15. The machine-readable storage medium of claim 13, wherein the timing information is asynchronously distributed through one or more dedicated circuits, and wherein for each timing domain, the slave interface is included in a different line card than the one or more master interfaces.

16. The machine-readable storage medium of claim 13, wherein each slave interface is an IEEE 1588 capable Ethernet ports implementing an IEEE 1588 slave interface and each master interface is an IEEE 1588 capable Ethernet port implementing an IEEE 1588 master interface.

17. The machine-readable storage medium of claim 16, wherein the network element implements IEEE 1588 Boundary, Ordinary, or Transparent Clock function.

* * * * *

UNITED STATES PATENT AND TRADEMARK OFFICE
CERTIFICATE OF CORRECTION

PATENT NO. : 7,773,606 B2
APPLICATION NO. : 12/235424
DATED : August 10, 2010
INVENTOR(S) : Dobjelevski et al.

Page 1 of 1

It is certified that error appears in the above-identified patent and that said Letters Patent is hereby corrected as shown below:

In Column 1, Line 58, delete "invention." and insert -- invention; and --, therefor.

In Column 4, Line 37, delete "($SAT_{P120}$)," and insert -- ($ST_{P120}$), --, therefor.

In Column 7, Line 27, delete "($SAT_{P220}$)," and insert -- ($ST_{P220}$), --, therefor.

In Column 7, Line 37, delete "($STP_{223}$)," and insert -- ($ST_{P223}$), --, therefor.

In Column 7, Line 39, delete "($LCP_{223}$)," and insert -- ($LC_{P223}$), --, therefor.

In Column 8, Line 19, delete "($SAT_{P221}$)," and insert -- ($ST_{P221}$), --, therefor.

In Column 8, Line 21, delete "($SAT_{P220}$)," and insert -- ($ST_{P220}$) --, therefor.

In Column 8, Line 22, delete "$STP_{220}+$" and insert -- $ST_{P220}+$ --, therefor.

In Column 8, Line 24, delete "$STP_{220}+$" and insert -- $ST_{P220}+$ --, therefor.

In Column 8, Line 25, delete "$STP_{223}+$" and insert -- $ST_{P223}+$ --, therefor.

In Column 9, Line 11, delete "(though" and insert -- (through --, therefor.

Signed and Sealed this
Fifteenth Day of February, 2011

David J. Kappos
*Director of the United States Patent and Trademark Office*